(12) United States Patent
McDermid

(10) Patent No.: US 6,223,237 B1
(45) Date of Patent: Apr. 24, 2001

(54) EXPANDABLE COMMUNICATIONS BUS

(75) Inventor: William James McDermid, Niwot, CO (US)

(73) Assignee: Adaptive Systems, Inc., Niwot, CO (US)

( * ) Notice: Subject to any disclaimer, the term of this patent is extended or adjusted under 35 U.S.C. 154(b) by 0 days.

(21) Appl. No.: 09/111,500

(22) Filed: Jul. 7, 1998

(51) Int. Cl.[7] .............................. G06F 13/36; G06F 13/38; G06F 13/40
(52) U.S. Cl. ........................... 710/127; 710/126; 710/119
(58) Field of Search .................................. 710/126–129, 710/107, 101, 113, 36, 241, 119, 121, 266; 709/225, 232; 711/100; 340/825.5; 370/257, 401, 402, 438, 462; 713/600

(56) References Cited

U.S. PATENT DOCUMENTS

| | | | |
|---|---|---|---|
| 5,083,260 | * | 1/1992 | Tsuchiya . |
| 5,461,723 | * | 10/1995 | Shah et al. . |
| 5,745,708 | * | 4/1998 | Weppler et al. . |
| 5,898,857 | * | 4/1999 | Beaman et al. . |
| 5,901,332 | * | 5/1999 | Gephardt et al. . |
| 5,909,559 | * | 6/1999 | So . |
| 5,936,953 | * | 8/1999 | Simmons . |
| 5,978,879 | * | 11/1999 | Harumoto et al. . |

* cited by examiner

Primary Examiner—Gopal C. Ray
(74) Attorney, Agent, or Firm—Duft, Graziano & Forest, P.C.

(57) ABSTRACT

An Expandable communications bus system for transferring data between a plurality of devices. The expandable communications bus system is comprised of a plurality of communication busses each capable of transferring n bits of data between devices. A device may be connected to any multiple of the communication busses. Mn bits of data may be transferred at one time between devices using m busses. Other busses in the system transfer can data between other devices while the transfer over m busses is occurring allowing for more efficient use of bus resources. For each communications bus that is connected to a device, the device has an interface that controls the transfer of data over the communications bus. Arbitration for a bus is performed by the interface of each device connected to the bus.

46 Claims, 12 Drawing Sheets

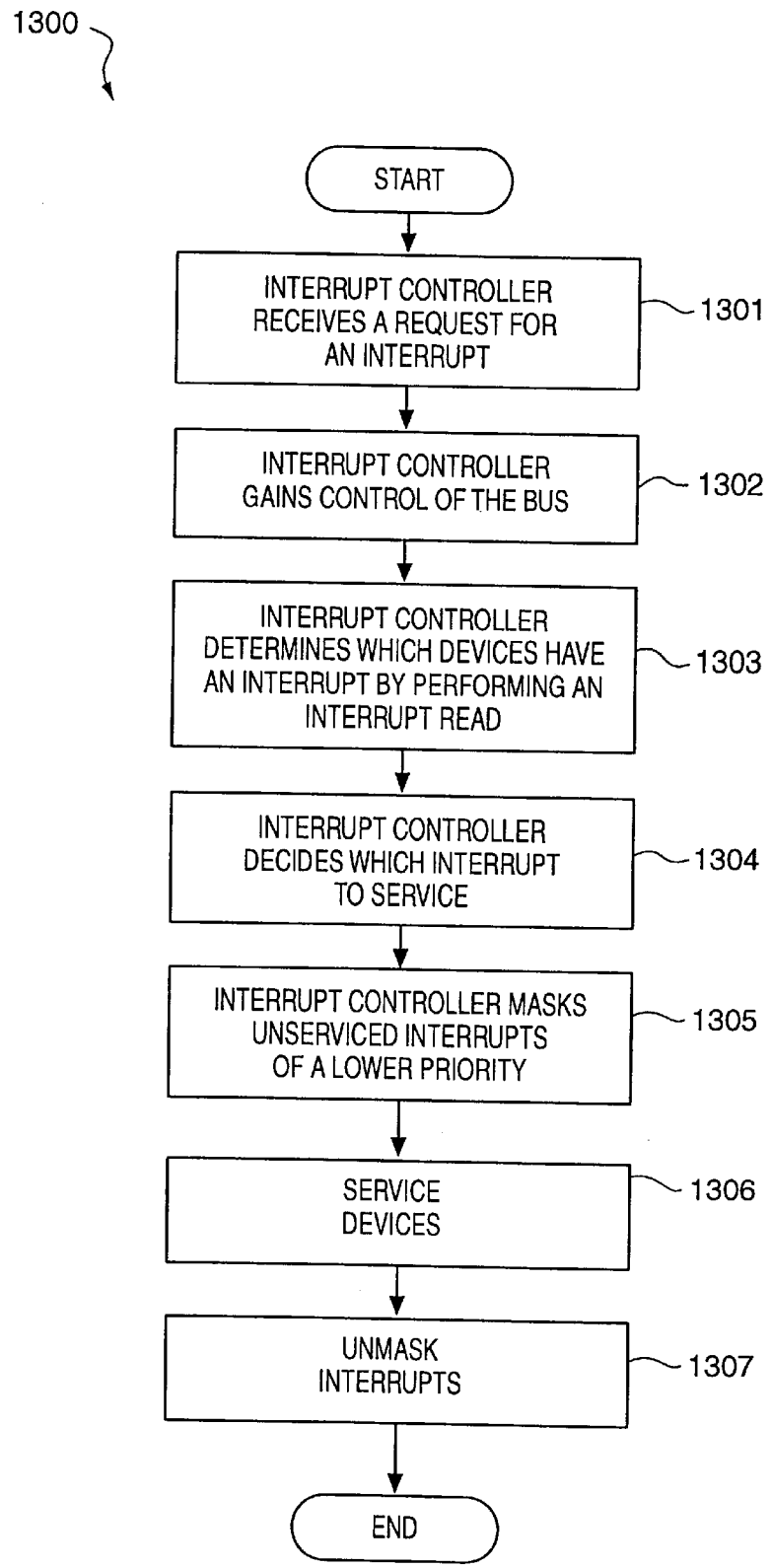

EXPANDABLE COMMUNICATIONS BUS

FIELD OF THE INVENTION

This invention relates to a communication bus for interconnecting devices in a computer system. More particularly, this invention relates to a communication bus comprising multiple individual busses that allow data to be transferred between devices at varying datawidths.

PROBLEM

A computer system has multiple devices that share data to perform the functions provided by the system. For purposes of the present discussion, a device is a system component that performs a specific function to process data. Examples of devices include a processor, video drivers with connected displays, disk drives, keyboards, mouses, printers, and network interfaces. In the computing arts, it is a problem to increase the speed or throughput of data transfers between these devices. For example, video drivers must quickly receive great amounts of data to produce animated graphics. If the data transfer is slow, the animated graphics tend to have pauses and do not appear to have a continuous motion when viewed on a monitor. In order to avoid this and other problems, those skilled in the computing arts are always attempting to improve throughput of the transfer of data between devices.

In computer systems, the transfer of data between devices is completed over a communication path known as a communication bus. The datawidth or amount of data that a communication bus can carry per transfer is significant factor in improving the throughput of data transfers. The datawidth of a communication bus is the number of bits that can be carried at one time by a bus. The number of bits that can be carried by the bus is determined by the number of data lines in the bus. For example, a thirty-two bit bus has thirty-two data lines for carrying data between devices.

It is a problem to simply add more data lines to a bus to increase throughput. One problem is that the cost of manufacturing chips and connectors for connecting devices to the bus increases as the number of data lines increases. A second problem is that power consumption increases as more data lines are added because more power is needed to generate the greater number of signals transmitted over the bus. This is a significant problem in computer systems which have a limited power supply. One example of such a system is a "Laptop PC" having a battery for a power supply. A third problem is that the size of the bus increases which is unacceptable when space inside a system is at a premium.

Additionally, the throughput of a bus is limited by the length of the bus and the number of devices connected to the bus. The length of a bus becomes a limiting factor because as the length of the bus increases, the amount of time needed for signals and signal reflections to travel along the bus between devices increases. The number of devices connected to the bus is a limiting factor because as the number of devices increases, the amount and time required to change the state of signals increases.

It is a further problem that a bus can only be used to perform one transfer between devices at one time. In order to transmit or receive data over the bus, a device must be the bus master of the communication bus. A bus master is the device that controls data transfers over the bus. A communications bus can only have one bus master at any given time. This is a problem if more than one device require a data transfer at the same time. An arbitration system is required to determine which device may transfer data over the communications bus at a given time. This ensures that each device is allowed to transfer the required data.

SOLUTION

The above and other problems are solved and an advance in the computing arts is made by the provision of an expandable communications bus system. In accordance with this invention, a communication bus system has m identical communication busses. Each communication bus has n data lines. For example, a preferred exemplary embodiment has 2 communication busses that each have 32 data lines. Devices connected to the communication bus system transfer yn bits of data at one time by connecting to y busses where y is less than m. For example, a 64-bit device connected to the bus system of the preferred embodiment can connect to one bus to transfer 32 bits of data or both busses to transfer 64 bits of data. Each different bus in the expandable bus system can be transferring data between different devices at the same time. For example, a first bus may be used to transfer data between a first and second device while a second bus is being used to transfer data between a third and a fourth device. The expandable bus system also reduces the amount of control lines needed in each bus which allows multiple busses to be added to the system without greatly increasing the cost, size, or power consumption of each bus.

The communications bus system of the present invention includes m communication busses with each bus having n data lines and q control lines. Each device has x bus interfaces connecting the device to a set of x busses wherein x may be different for each of the device in the system. For example a preferred exemplary embodiment, a first device connected to the bus system is connected to both busses, a second device connected to the system is connected to both busses, a third device is connected to the first bus, and a fourth device is connected to the second bus.

Data transfers over the m busses are controlled by the bus interfaces connected to each communication bus. When a device requires a data transfer of zn bits of data, the x interfaces in the device attempt to use z amount of the m busses to complete the transfer in one cycle where z is less than m. If z is greater than m or z busses cannot be used to complete the transfer in one cycle, a burst or multiple consecutive data transfers over the busses must be performed to complete the transfer. For example, a first device may require a transfer of 64-bits to a second device in the preferred embodiment. The first device would signal each interface connecting the device to the two busses in the system that the device requires control of both busses for a data transfer. The interface would then each attempt to control the connected bus. If the device receives control of only the first bus, the device will complete the transfer in two transfer cycles over the first bus. If the first device receives control of both busses the first device will transfer data to the second device in one cycle over each bus In order to allow each device to be connected to a set of x busses, a diagnostic operation must be performed during a system initialization to determine which devices are connected to which busses. One example of system initialization is when a user turns on a computer system. The information about the devices connected to each of the m busses is stored in a memory of each bus interface in every device connected to the system. The information is used by the bus interfaces to determine whether a bus can be used to transfer data between devices as set out below.

The following process is used to transfer data between a first device and a second device over the expandable communication bus system. When the first device requires a data transfer, a signal is transmitted to each of the x bus interfaces in the first device connecting the first device to the x busses. Each of the x interfaces determines whether the second device is connected to the bus that is also connected to the interface. Each of the x Interfaces that are connected to a bus connected to the second device determine whether the first device is the master of the bus. The x interfaces that do not have control of the connected bus determine if the first device is the master of other busses that are able to complete the transfer. If the first device controls other busses that can complete the entire data transfer in one cycle, the controlled busses divide the data and transfer the data over the respective busses. If busses controlled by a first device cannot complete the transfer in one cycle, each bus interface in the first device that is connected to a bus also connected to the second device transmits an arbitration request signal over the connected bus. Interfaces in other devices that are connected to the bus receive the arbitration request signal and arbitration occurs.

The following is an example of the above described process executed in the preferred exemplary embodiment. A first device that is connected to both busses in the preferred exemplary embodiment needs to write data to a second device also connected to both busses. The first device transmits a request signal to both interfaces in the first device that connect the device to the busses. Each interface determines whether the first device is the master of the connected bus. When a first interface has control of its bus, it determines whether the second interface has control of the second bus. If the second interface does not have control of the bus, the first bus begins the data transfer. If the second interface does have control of the bus, the first and second interfaces divide the data transfer and proceed with the data transfer.

When a first interface does not have control of the connected bus, the first interface determines whether the second interface has control of the second bus. If the second interface has control of the second bus, the first interface determines whether the second interface can complete the transfer in one transfer cycle. If the second interface cannot complete the transfer in one cycle, the first interface request arbitration of the first bus.

Arbitration for a bus is executed in the following manner. Each interface in a device needing the bus applies an arbitration request signal to a specified arbitration line in the bus. The current bus master acknowledges the arbitration request and begins arbitration. Each participating interface applies an arbitration signal to predetermined control lines after the master acknowledges the arbitration. All interfaces connected to the bus read all of the predetermined control lines and use a priority system to determine which received arbitration lines represent the next bus master. The next bus master gains control of the bus when the current master indicates that the current data transfer is complete.

The above arbitration process is divided into two separate steps in a preferred embodiment to reduce the amount of control lines needed for arbitration. Each device belongs to a block of devices that have a same level of priority for use of a bus. Each block is represented by a common control line. When arbitration begins, an interface transmits an arbitration signal over the control line representing the block of the device. The interfaces read the block signals received over the control lines and determine which block has the highest priority for use of the bus. Devices not belonging to the highest priority block release the arbitration lines to allow the lines to be used in the next step. Each interface in a device belonging to the highest priority block applies an arbitration signal to a predetermined control line on the bus. The other interfaces of devices in the priority block read the control lines and determined the next bus master from signals received over the control lines.

When an interface gains control of a bus through arbitration, the interface determines the amount of remaining data to be transferred by the device. If the amount of remaining data exceeds n bits of data and the interface cannot transfer all of the data in one data cycle, the interface determines whether the device currently controls other busses. If other busses are available to transfer data, all of the interfaces controlling busses in the device divide the data and transmit n bits of the data to a second device over the respective busses. If the transfer is complete, the interface no longer transmits data over the bus and the bus may go idle or the next master may begin a data transfer.

A transfer of data occurs in the following manner. The interface transmits an address of the second device over the data lines of the bus. A read/write control signal is transmitted with the address over a read/write enable line to indicate the type of data transfer the controlling interface is performing. A write signal indicates that the bus master is transmitting data to the second device and a read signal indicates that the bus master must receive data from the second device. The interface also transmits a control signal over a control line indicating the address and read/write signal are valid. When the interface of the second device receives the address and determines that the bus master is requesting a data transfer with the second device, the interface of the second device applies an acceptance signal to a second control line. Either the bus master or the interface of the second device then provides a clocking signal to coordinate the transmitting and receiving of data between the devices.

DESCRIPTION OF THE DRAWINGS

The above and other advantages of the present invention can be understood by reading the following detailed description in conjunction with the following drawings:

FIG. 13 is a flow diagram of a process for handling interrupts over a bus.

Figure 1:
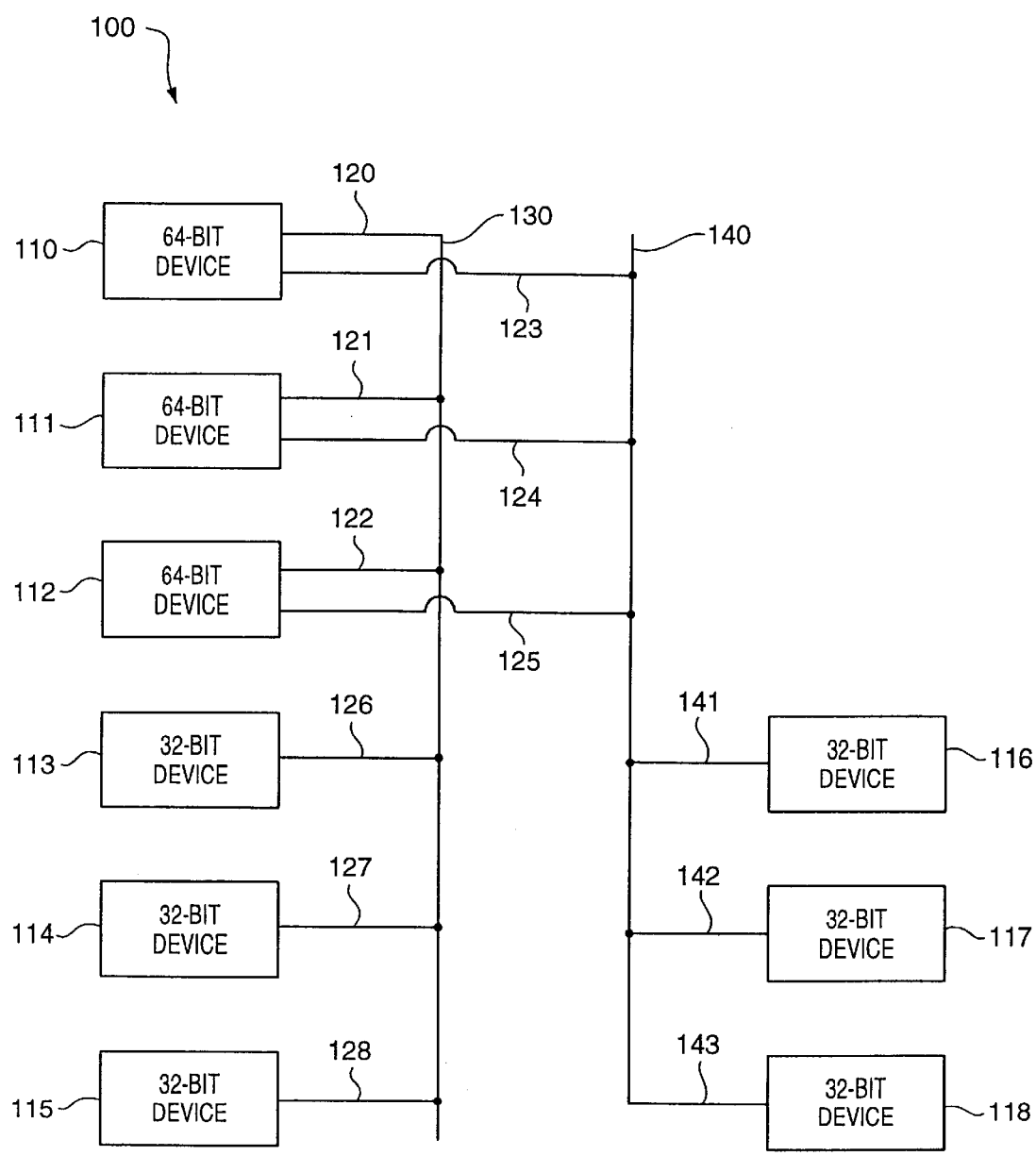
FIG. 1 is a block diagram of a computer system having an expandable communication bus system of the present invention.

DETAILED DESCRIPTION
An Exemplary Computer System—FIG. 1.

FIG. 1 illustrates a computer system 100 having an expandable communication bus system in accordance with the present invention. The expandable communications bus system allows data transfers of varying datawidths over the system. Additionally, different individual busses in the system can be used to transfer data between different device. For example, a first bus may be used to transfer data between a first device and a second device while a second bus is being used to transfer data between a third device and a fourth device.

The expandable communication bus system has m communication busses represented by two busses 130 and 140 in the preferred exemplary embodiment Each communication bus can transmit n-bits of data at one time. For example, communication busses 130 and 140 can each transmit 32-bits of data at one time in a preferred embodiment.

Devices 110–118 transmit data between one another over the expandable bus system. A device is a module of circuitry that performs a data processing function. Some examples of devices include but are not limited to processors, disk drives, Memory modules, input devices, and video devices. Each device is capable of transferring yn- bits of data at a time where y is less than or equal to m. For example, devices 110–112 can transmit 2n-bits or 64-bits of data and devices 113–118 can transfer 1n-bits or 32-bits of data at one time.

A device can be connected to x different buses where x is less than or equal to y. In the exemplary embodiment, devices 110–112 are connected to bus 130 via paths 120–122 and to bus 140 via paths 123–125 since these devices are capable of transferring 2n-bits of at a time. It is possible that these devices could be connected to either bus 130 or bus 140 singularly. It should be noted that a device capable of transmitting yn-bits of data could be connected to any subset of m busses. In FIG. 1, devices 113–115 are connected to bus 130 via paths 126–128 and devices 116–118 are connected to bus 140 via paths 141–143 because devices 113–118 are capable of only transferring 1n-bits of data at a time and can only be connected to one bus.

Devices, such as devices 114 and 116, that are not connected to common busses communicate in the following manner. A first device transfers data to an intermediate device having a first set of busses in common with the first device and a second set of busses in common with the second device. The intermediate device transfers the data received from the first device to the second bus using the second set of busses.

Figure 12:
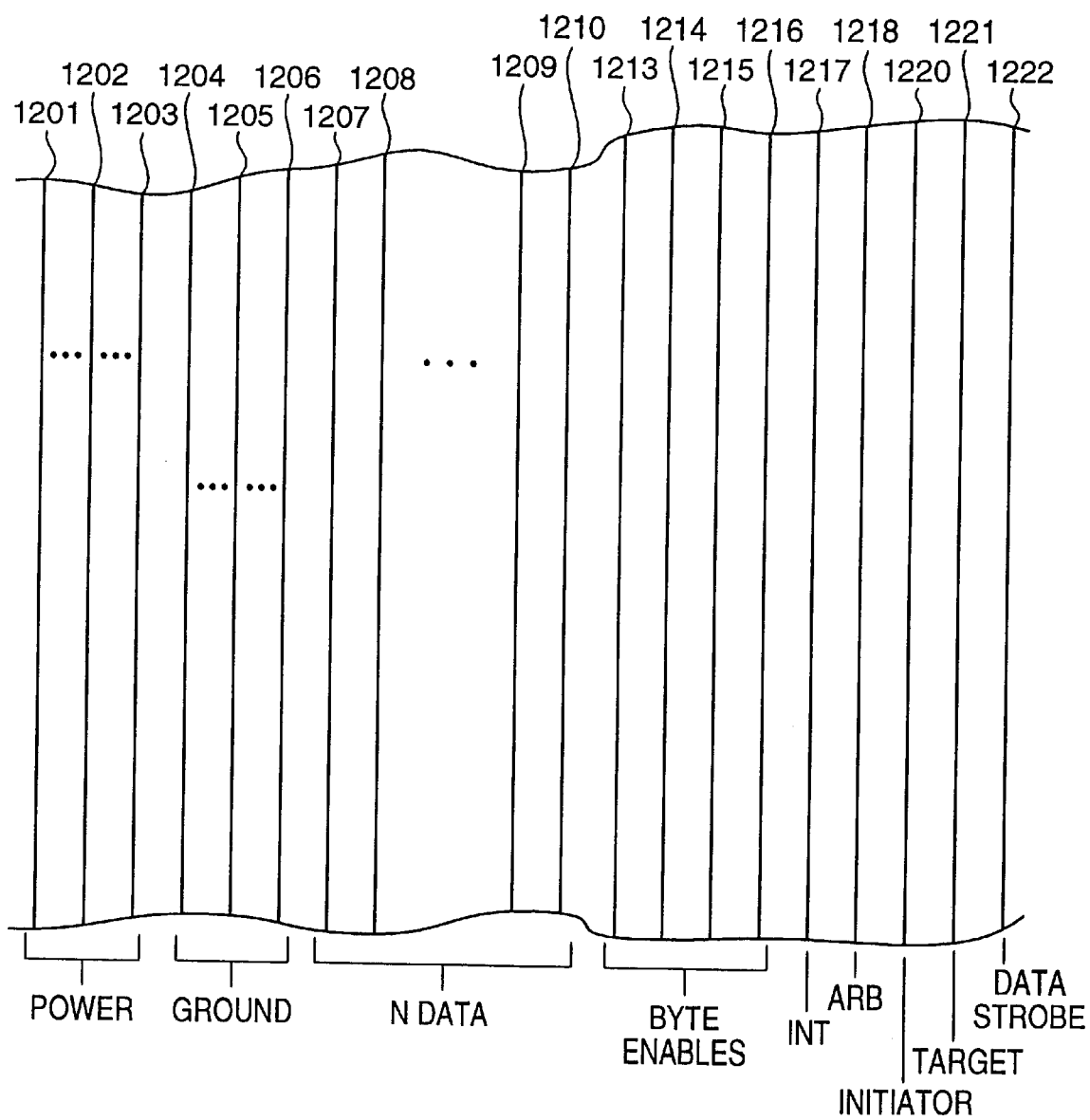
FIG. 12 is a diagram of paths in a communication bus in the expandable communications bus system.

An Exemplary Communication Bus—FIG. 12.

FIG. 12 illustrates an exemplary communication bus 1200. Communication bus 1200 has p power supply lines 1201–1203 and g ground lines 1204–1206 to supply power to the connected devices. N multiplexed address/data lines 1207–1210 transmit addresses to indicate which device is a target device during an address phase of a data transfer cycle and transmits data between devices during a data phase of a data transfer. Multiplexed byte enable lines 1213–1216 are used to indicate the type of data transfer to be completed during an address phase of the data transfer cycle and for arbitration during a data phase of a data transfer cycle. Interrupt line 1217 is used by the devices to signal an interrupt request to an interrupt controller. Arbitration line 1218 is used by the devices to signal an arbitration request. Initiator line 1220 is used by a device to indicate a valid address has been applied to address/data lines 1207–1210 during an address phase of a cycle. Target line 1221 is used by the target device to indicate that a request for a data transfer cycle has been accepted. Data strobe line 1222 is used to indicate valid data on the bus during a data phase of a cycle.

Figure 2:
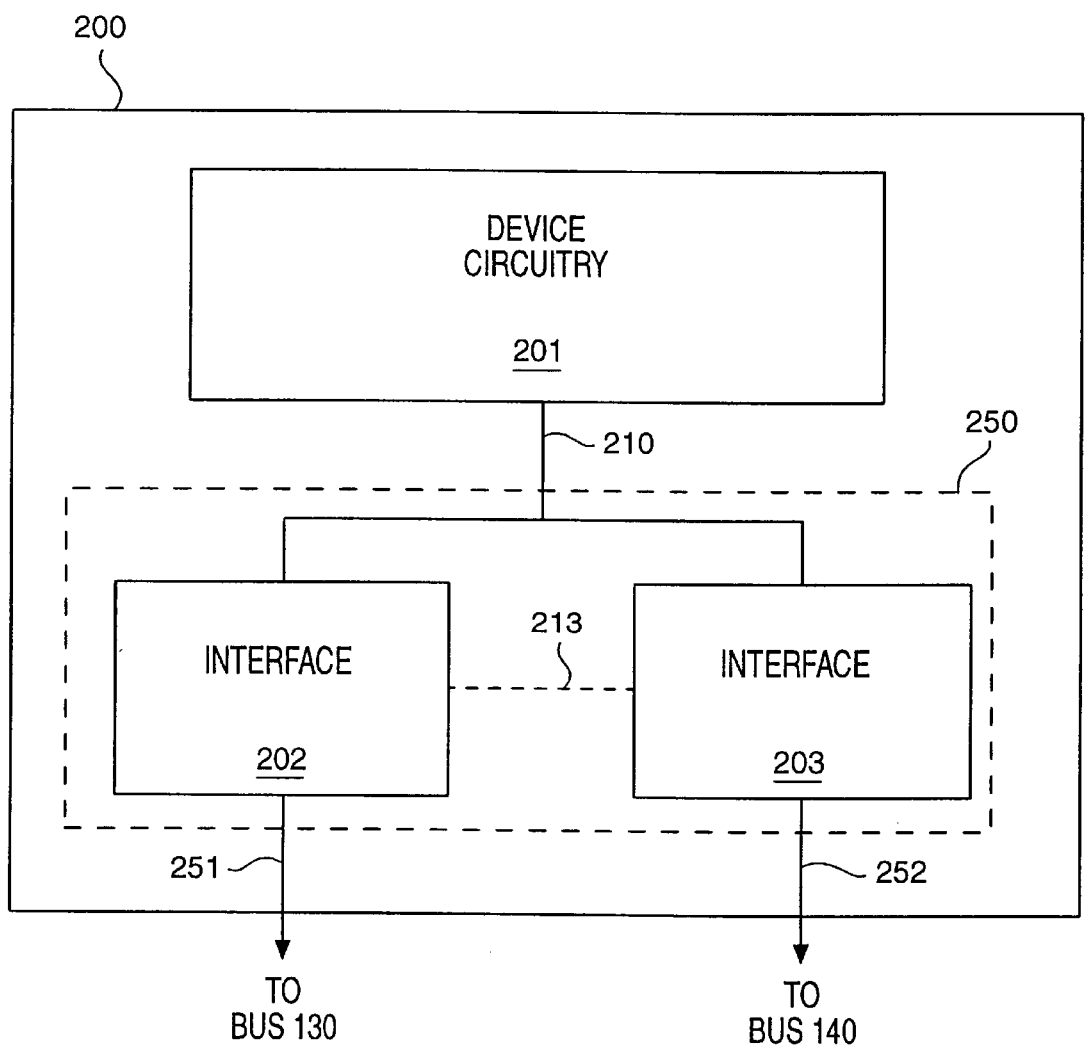
FIG. 2 is a block diagram of a device connected to the expandable communications bus system of the present invention.

An Exemplary Device—FIG. 2.

FIG. 2 illustrates device 200 which is an exemplary device. Device 200 is a device capable of transferring 64-bits or 2n-bits of data. However, it is understood that device 200 may be a device capable of yn- bit data transfers where y is less than or equal to m, the number of busses in system 100. Device circuitry 201 performs the data processing operations in device 200. The specific workings of device circuitry 201 is unimportant for purposes of the present invention. Device circuitry 201 is connected to device to bus system bridge 250 via path 210. Device to bus system bridge 250 performs the necessary operations for transferring data to other devices over the expandable communications bus system.

Device to bus system bridge 250 includes a bus interface 202–203 for each of m communication busses that is connected to device 200. For example, device 200 has device to bus system bridge 250 which connects to communication busses 130 and 140 via paths 251 and 252 because device 200 can transfer 64-bits of data. If device 200 could only transfer 32-bits of data, device to bus system bridge 250 would only be connected to one communications bus. Each bus interface 202–203 receives and transmits data to device circuitry 201 via path 210. Bus interfaces 202 and 203 are communicatively connected via a path 213 to coordinate data transfers over the separate busses. Bus interface 202 transfers data to and from communications bus 130 via path 251. Bus interface 203 transfers data to and from communications bus 140 via path 252.

Figure 3:
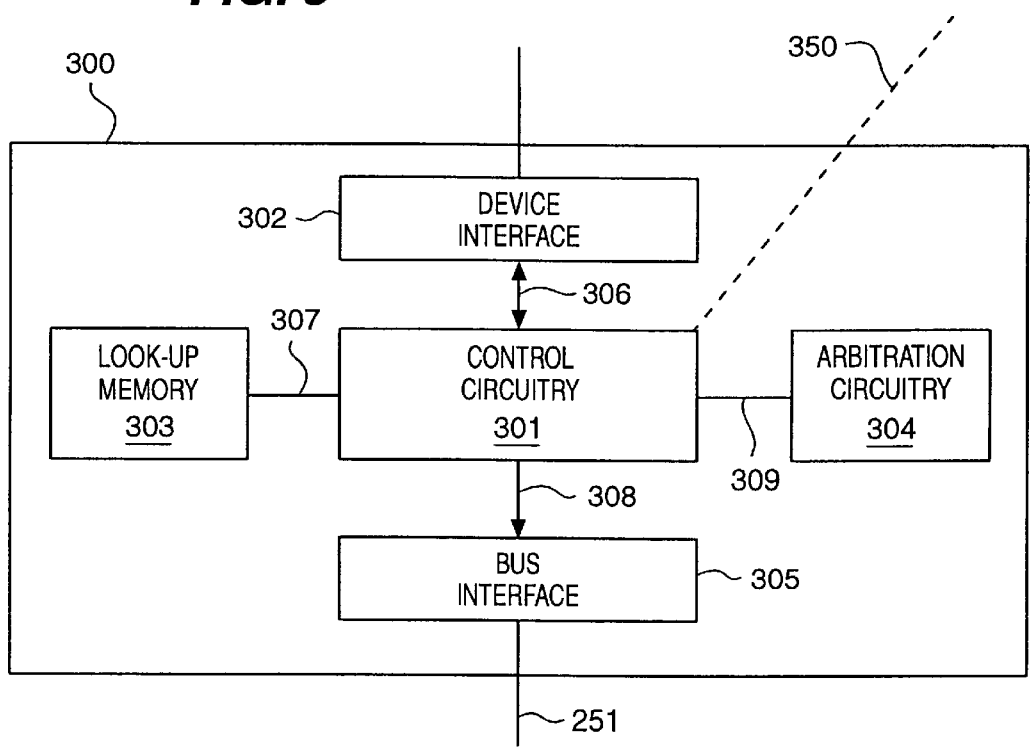
FIG. 3 is a block diagram of a communication bus interface of a device.

An Exemplary Bus Interface—FIG. 3.

FIG. 3 illustrates a bus interface 300 which connects a device to a communication bus. Bus interfaces 202 and 203 are examples of bus interfaces designed with the components illustrated in FIG. 3. Control circuitry 301 controls the functions of interface 300. Device interface module 302 performs the operations of transferring data to device circuitry 201 from interface 300 and is connected to control circuitry 301 via path 306. Bus interface module 305 transfers data between interface 300 and a communication bus, such as communication bus 130, and is connected to control circuitry 301 Via path 308. An address look-up memory 303 is connected to control circuitry 301 via path 307. Address look-up memory 303 stores the addresses of all devices connected to each of the communication busses and is used to determine whether a communication bus can be used for data transfers between devices. Arbitration circuitry 304 is connected to control circuitry 301 via path 309 and is used to perform and track arbitration for the communication bus connected to interface 300. Control circuitry 301 is also communicatively connected to other interfaces in communications device to bus system bridge 250 via path 350. This allows the interfaces 300 to coordinate data transfers over multiple communication busses in the system.

Figure 4:
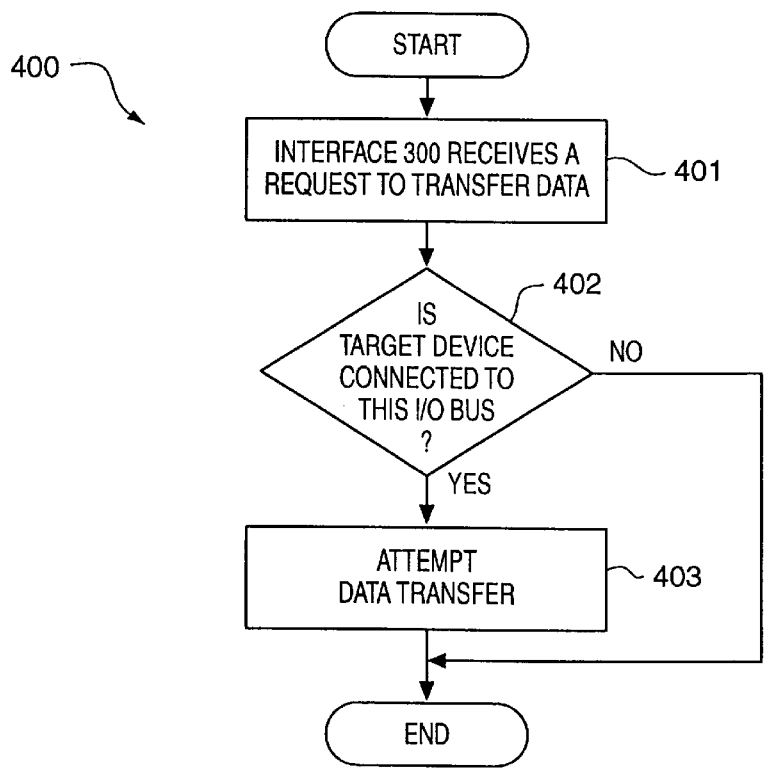
FIG. 4 is a flow diagram of a process for performing a data transfer.

An Operational Overview of a Data Transfer Over an Communications Bus in the Present Invention—FIG. 4.

In accordance with the present invention, process 400 is executed by each interface 300 in device to bus system bridge 250 of a first or initiator device 200 when the initiator device requires a data transfer with a second or target device 200. Process 400 begins in step 401 with the interface 300 in an initiator device receiving a request for a data transfer from the device circuitry 201 of the initiator device for a data transfer with the target device . In step 402, the interface 300 reads address look-up memory 303 to determine if the target device is connected to the communication bus connected to the interface 300. This is performed by each interface 300 to determine if there is at least one common bus between the initiator and target devices. If the interface is not connected to a communication bus that is also connected to an interface in the target device, process 400 ends. In this case other interfaces in the initiator must complete the data transfer. If interface 300 is connected to a communication bus that is also connected to an interface in the target device, a data transfer over the bus is attempted in step 403. When the data transfer of step 403 is complete, process 400 ends.

Figure 5:
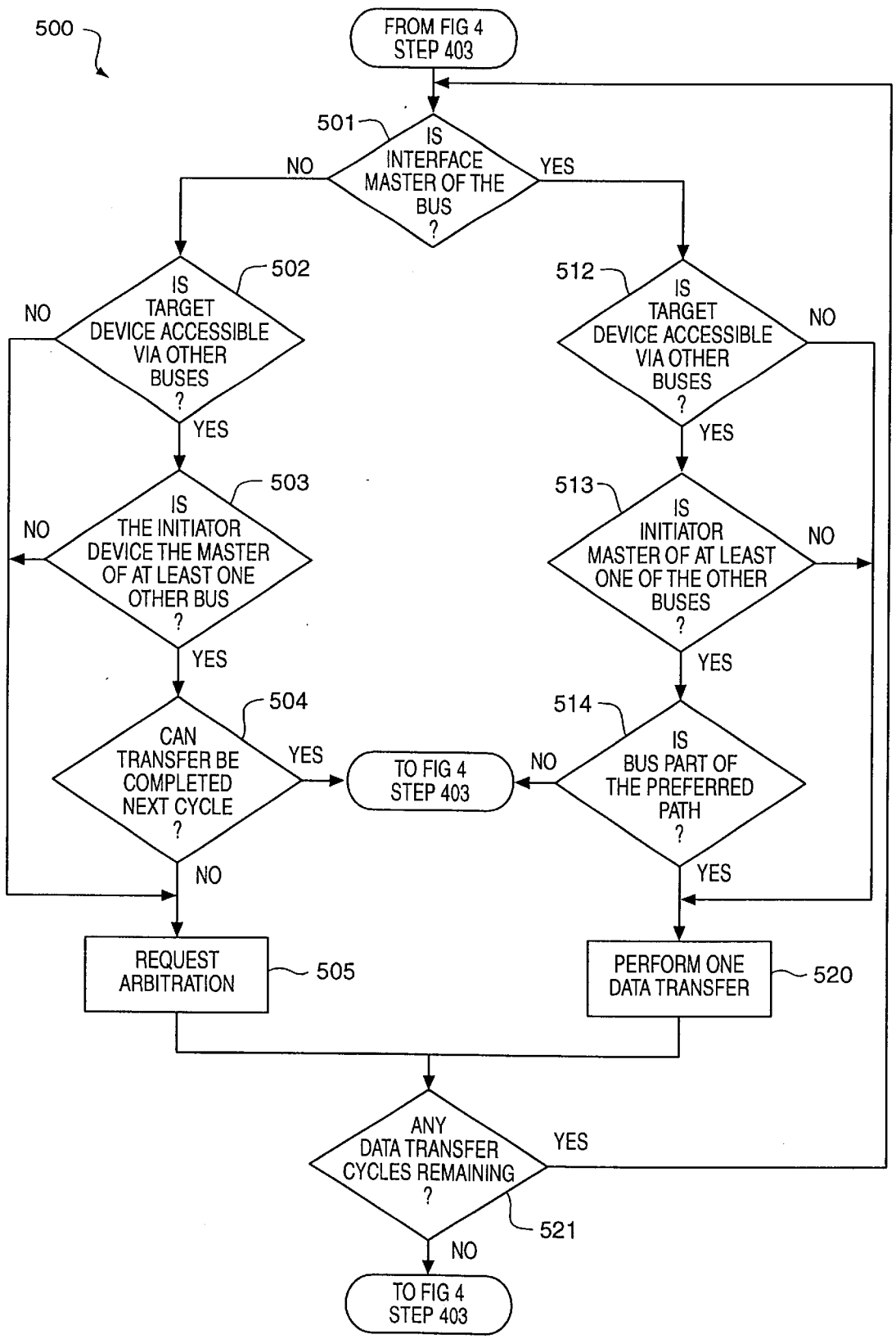
FIG. 5 is a flow diagram of a process that an interface of a bus master performs to set-up a data transfer.

A Process for Transferring Data—FIG. 5.

Process 500, illustrated in FIG. 5, is a process for attempting to transfer data that is executed by an interface 300 when the target device is connected to the communications bus of the interface. Process 500 allows the interface in the device to bus system bridge 250 of the initiator device to coordinate the use of multiple communication busses to perform the data transfer between the initiator and target devices. Process 500 begins in step 501 by determining whether the interface is the master of the communication bus. If interface 300 is the master of the of the communication bus, step 512 is executed. If interface 300 is not the master of the bus, step 502 is executed.

In step 502, interface 300 determines if the target device is accessible over other communication busses. If the target device is not accessible by the device via other communication busses, interface 300 must transmit an arbitration request signal indicating that the device of interface 300 requires control of the communication bus. If the target device is accessible by other busses, interface 300 determines which of the other interfaces 300 in the initiator device that are connected to the other common busses are the master of the connected busses in step 503. If no other interface 300 in the initiator device is the master of a communication bus connected to the target device, interface 300 transmits an arbitration request signal in step 505. If other interfaces 300 in the initiator device are the current master of communication busses connected to the target, interface 300 determines whether the entire data transfer can be completed in one data transfer cycle in step 504. If the entire transfer cannot be completed in one cycle, interface 300 requests arbitration in step 505. Otherwise, interface 300 returns to step 403 of FIG. 4. After a request for arbitration is transmitted, an arbitration process between the interfaces in all the devices connected to the bus begins. The arbitration process is described below. After the arbitration, interface 300 determines if there are any more data transfer cycles to be completed in step 521.

If interface 300 is the current master of the bus in step 501, control circuitry 301 determines if the target device is connected to other common communication busses in step 512. If the target device is not connected to other common busses, at least part of the data transfer is completed in step 520. If there are other busses in common between the target and initiator devices, interface 300 communicates with the other interfaces in the initiator device to determine if the initiator device is the master of the other common communication busses in step 513. If the initiator device is not the current master of any of the other common communication busses, interface 300 completes at least part of the data transfer over the connected bus in step 520.

If the initiator device is the current master of other communication busses in step 513, interface 300 communicates with the other interfaces 300 in the initiator device to determine whether the communication bus of interface 300 is part of a preferred path in step 514. If the communications bus is part of a preferred path from steps 514, the communication bus is used to complete at least part of the data transfer cycle in step 520. ff the communication bus is not part of a preferred path and the other interfaces that are part of the preferred path can complete the transfer in one cycle, process 500 ends and returns to step 403 of FIG. 4.

After a data transfer cycle is complete, interface 300 determines whether there is another data transfer cycle to complete. The determination is made by communicating with other interfaces 300 in the initiator device to determine if the data transfer was completed in step 521. If there is not another data transfer cycle to complete process 500 returns to step 403 of FIG. 4. If there are more data transfer cycles to complete, process 500 is repeated from step 501.

Figure 6:
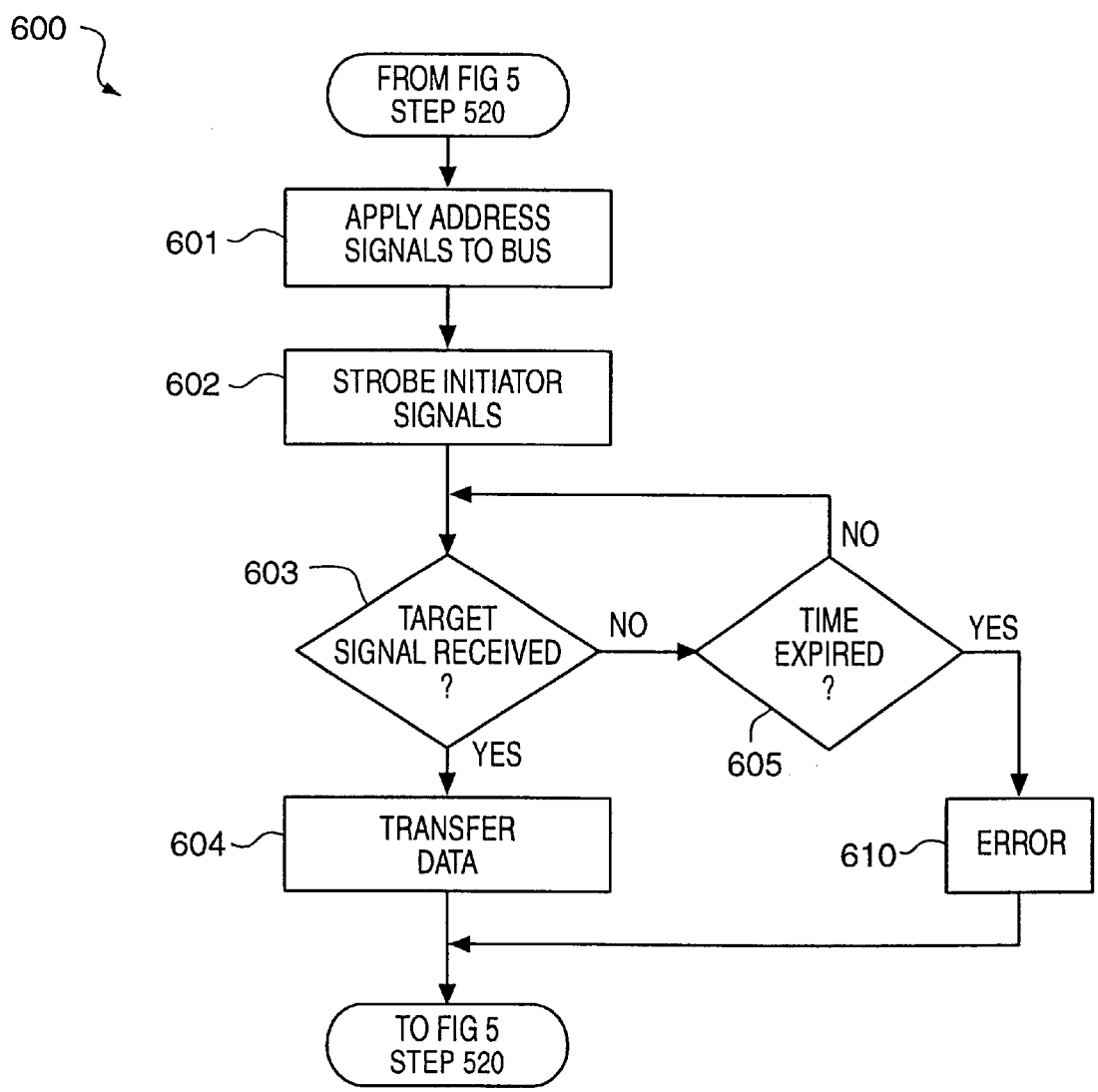
FIG. 6 is a flow diagram of a process performed by an initiator device to perform a data transfer.

Process For Completing a Data Transfer Cycle in an Initiator Device—FIG. 6.

The process of completing a data transfer cycle involves the transmitting of signals between the initiator device and the target device. The processes completed by each device during a data transfer are described below. A time diagram of the signals transmitted over the communications bus for a single cycle data transfer and for a burst cycle transfer is also provided below to illustrate signaling between devices to complete data transfers.

Process 600, illustrated in FIG. 6, is a data transfer process executed by an interface 300 in an initiator device that is a bus master controlling a bus. Process 600 begins in step 601 with interface 300 applying an address of the target device to the n address/data lines and byte enables of the bus. In step 602, interface 300 applies an initiator signal to an initiator line to signal that an address of a target device is being applied to the address and byte enable lines. Interface 300 then waits to receive a target signal over a target line in step 603. If the signal is not received, interface 300 determines if a timeout threshold has been reached in step 605. If the timeout threshold has not been reached, interface 300 returns to step 603. If the timeout threshold has been reached, interface 300 signals an error in step 610 and process 600 ends. If a target signal is received in step 603, interface 300 completes a transfer of data between the two devices in step 604 and process 600 ends.

The data transfer in step 604 may be a read or a write operation. If the data transfer is a read operation, data is being transmitted from the target device to the initiator device. In this case, the interface of the target device will strobe a data signal to indicate data is being transmitted over the bus. The data signal from the target device provides the clock for the data transfer.

In a write operation, the initiator device is transmitting data to the target device. The data transfer for a write operation is completed in the following manner. The initiator device receives the target strobe. The initiator device then strobes the data signal which provides the clock for the data transfer. By allowing the device transmitting data to provide the clock for the data transfer of the communications bus, the speed of the transfer is increased.

Figure 7:
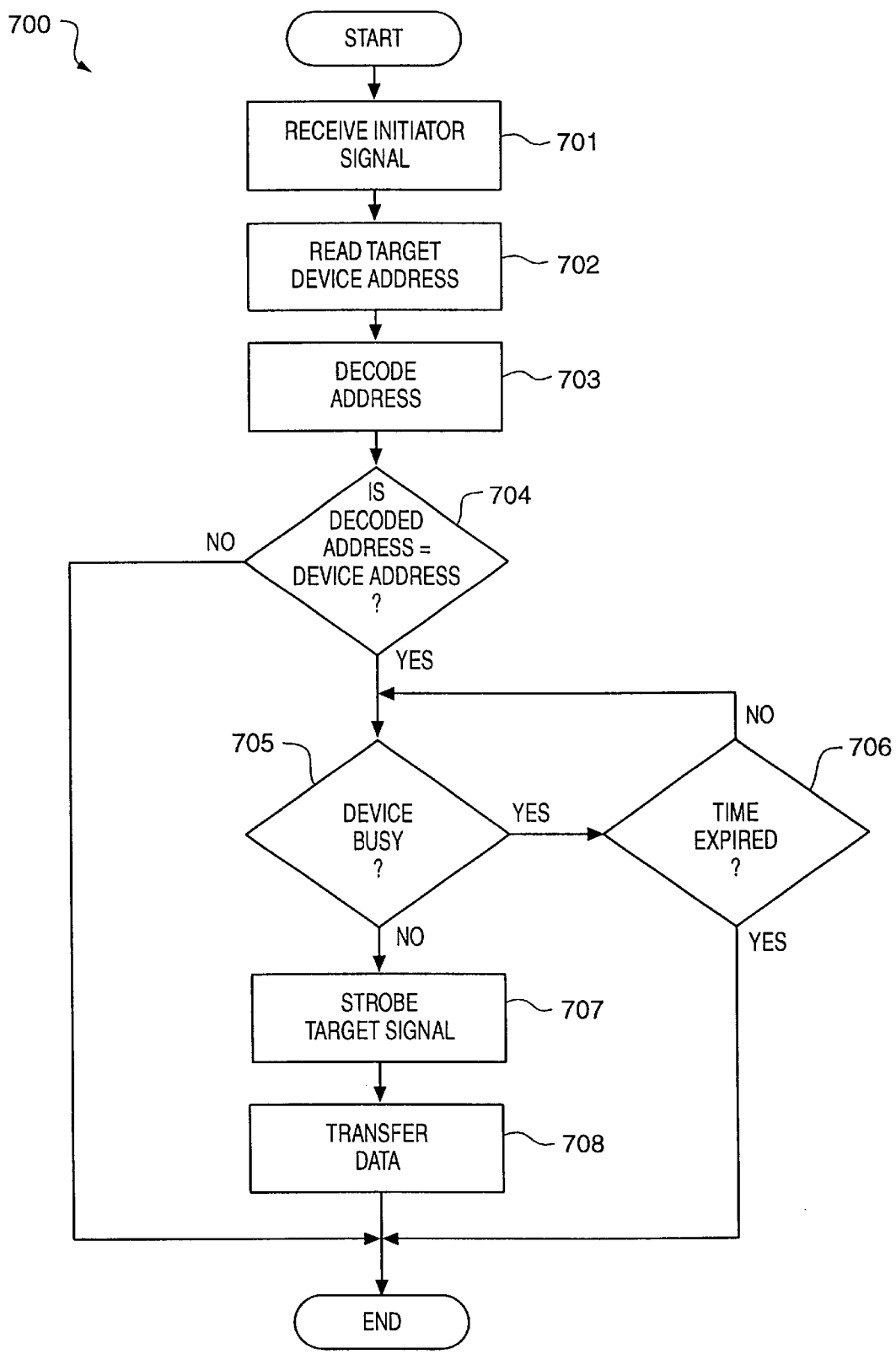
FIG. 7 is a flow diagram of a process that an interface of a target device performs to complete a data transfer.

Process For Executing a Data Transfer In a Target Device—FIG. 7.

Process 700 is executed by an interface connected to the bus in a target device completes when an initiator signal is read over a communication bus. Process 700 begins in step 701 with the interface receiving the initiator signal. The interface 300 reads the address of the target device from the data lines responsive to reading the initiator signal in step 702. In step 703, interface 300 decodes the read address and determines if the read address is equal to the address of the device containing the interface in step 704.

If the read address is not equal to the address of the device, process 700 ends. If the read address is equal to the address of the device, interface 300 interrogates the device circuitry to determine if the device is busy in step 705. If the device is busy, interface 300 determines if a time out period has expired in step 706. If the timeout period has not expired, step 705 is repeated. If the timeout period expires and the device is still busy, process 700 ends.

If the device is not busy in step 705, interface 300 strobes the target signal on the target signal line of the communications bus to indicate that the target device is ready to proceed with a data transfer in step 707. The data transfer is then completed in step 708 as described above in FIG. 6 and process 700 ends.

Figure 8:
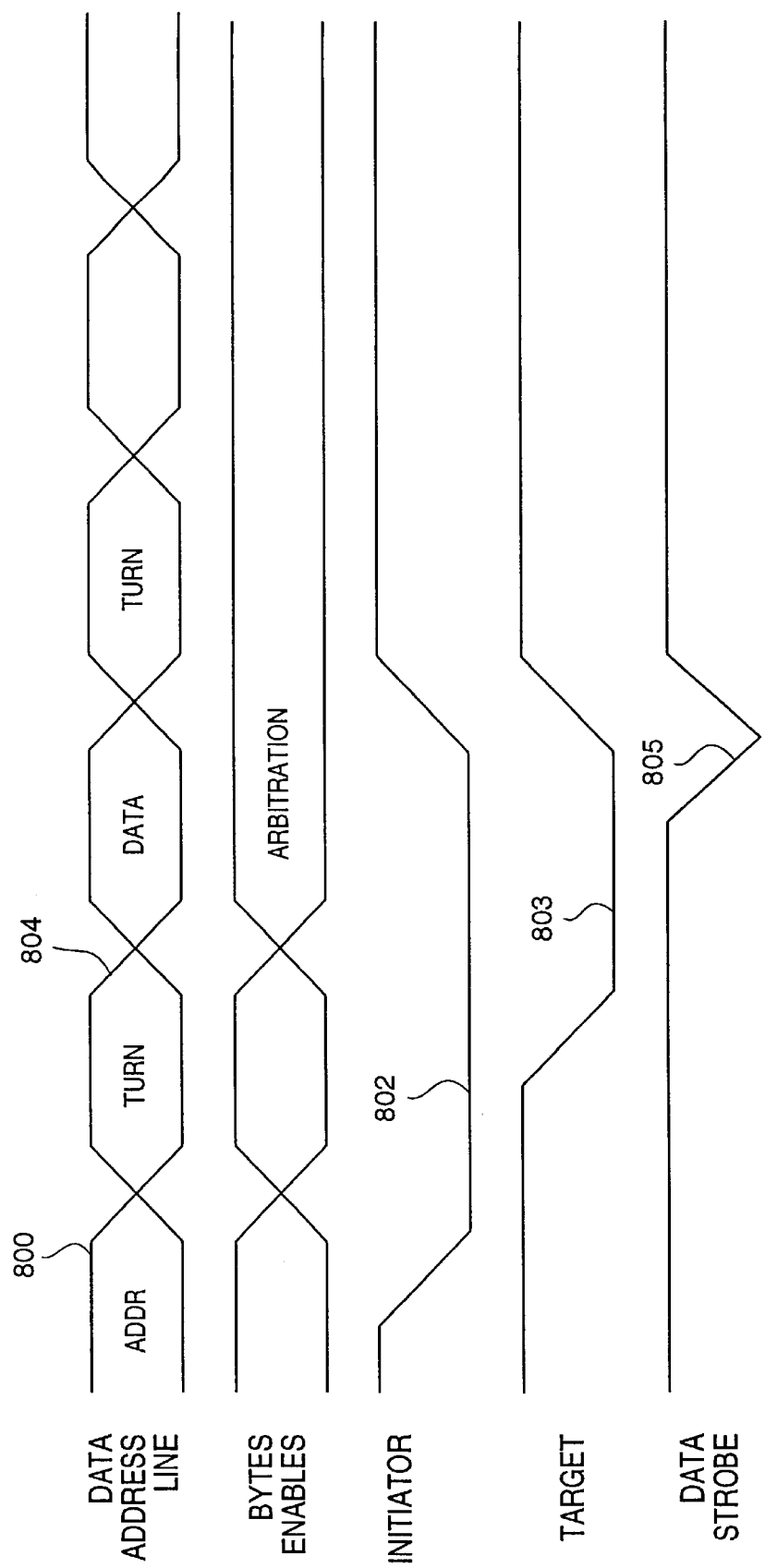
FIG. 8 is a time diagram of a single cycle data transfer.

A Time Diagram of Signals over an Communications Bus During a Data Transfer of a Single Cycle—FIG. 8.

Figure 9:
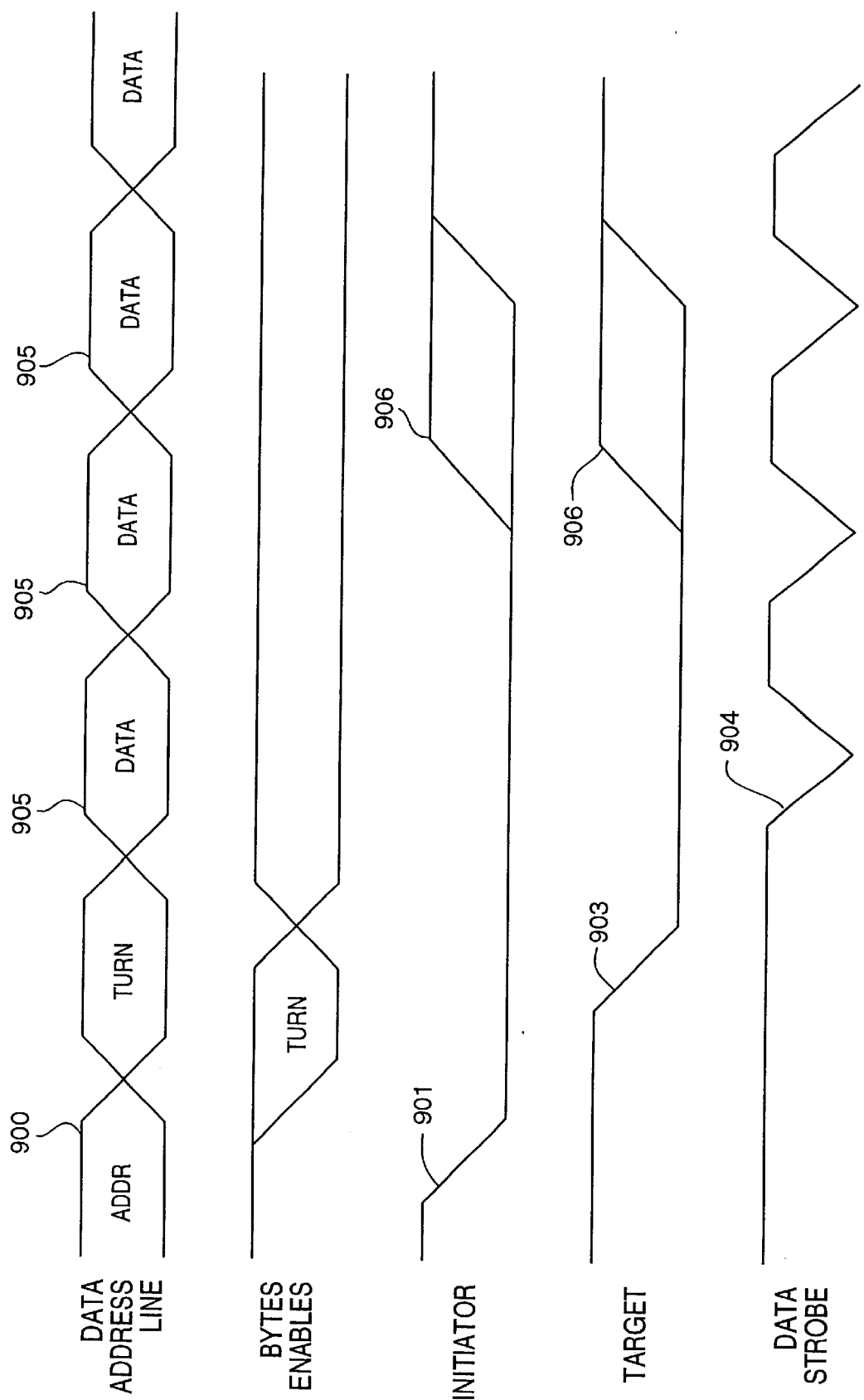
FIG. 9 is a time diagram of a burst data transfer.

FIGS. 8 and 9 describe the signals transmitted over a communication bus during a data transfer to explain the cooperation between interfaces in the initiator and target devices during a data transfer. There are two types of transfers that may take place a single cycle transfer and a burst cycle transfer.

FIG. 8 illustrates a single cycle transfer. At time 800, an address of a target is transmitted over the communications bus by driving the appropriate data lines to indicate a binary address of the target device. At least one of byte enables are also driven low to indicate that a single cycle transfer is being completed. At time 802, the initiator signal is strobed to indicate that a data transfer cycle is being initiated. The interfaces of other devices connected to the communication bus read the address from the data lines and read the byte enable lines. The interface in target device strobes the target signal at time 803 to indicate the data transfer cycle is accepted. The data transfer then begins at time 804 with the data being transmitted over the data lines for one clock cycle. A source, which is the initiator in a write operation or the target in a read operation, strobes the data signal to provide the clock for the transfer at time 805.

Process for Completing a Burst Cycle Transfer—FIG. 9

The time diagram in FIG. 9 illustrates the signaling over an communications bus during a burst data transfer cycle. In a burst data transfer cycle, multiple n-bit transfers of data are consecutively completed between the initiator and target devices over the bus. A burst data transfer cycle is indicated by all of the byte enable signals being inactive in the preferred embodiment. However, it is recognized that other combinations of active and inactive byte enables signals can be used to identify a burst data transfer cycle.

A burst data transfer cycle begins at time 900 with an address being applied to the data line of the bus by an interface 300 of the initiator device. At time 901, an initiator signal is strobed by the interface 300 of the initiator device to indicate an address of a target is being transmitted. The interfaces 300 of the other devices connected to the communication bus read the address and decode the address. The byte enable signals are also read and a target device determines that a burst cycle is being implemented.

The target device then applies a target signal to the target signal line of the bus at time 903 to indicate that the target is ready to complete a burst data transfer cycle. The device that is the source of the data then provides the data signal to clock the data transfer at time 904. A cycle of data is then transferred on every clock edge. On each rising edge of the data signal the initiator and target signals are sampled by the interfaces of the devices as seen at time 905. If either signal is inactive in the exemplary embodiment, the current data cycle being transferred is the last data cycle. Otherwise, data continues to be transferred between the devices. The strobing of a device signal is represented by time 906.

Figure 10:
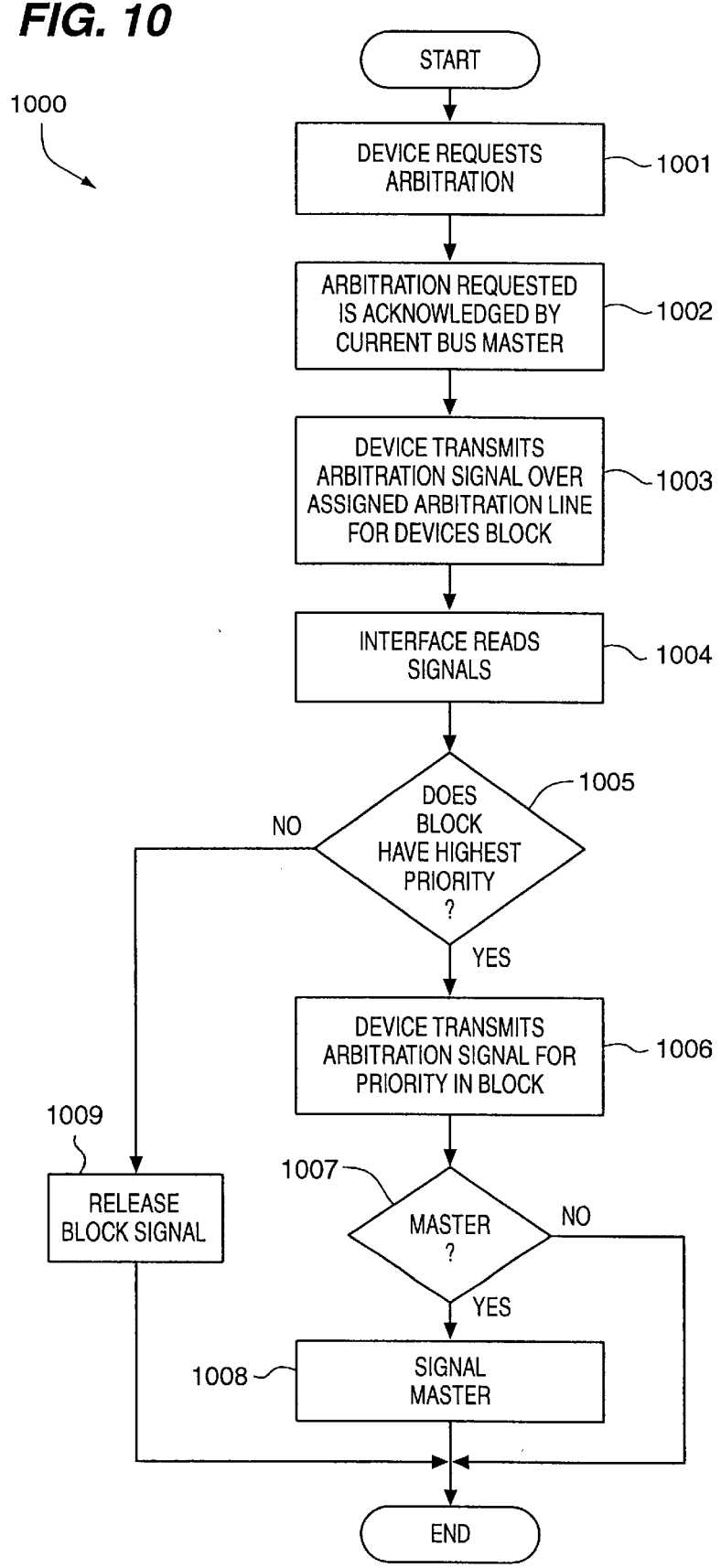
FIG. 10 is a flow diagram of an arbitration process performed by an I/O interface.

Process Executed by Each Interface During Arbitration—FIG. 10

Arbitration is the process for determining the next master of a communication bus. In the expandable communications bus system, arbitration occurs individually for each bus in the system. The interfaces 300 connected to a communication bus perform the arbitration. This is different from most bus systems in the prior art where one arbitration controller performs the arbitration for the bus.

FIG. 10 illustrates arbitration process 1000 executed by each interface 300 connected to a communication bus. Process 1000 begins when a device requires a data transfer and interface 300 of the device requires control of the bus. Interface 300 applies an arbitration request signal to an arbitration request line in step 1001. In step 1002, the arbitration request signal is acknowledged by the interface 300 of the current master of the bus. In the exemplary embodiment, the acknowledgment is performed by the master causing the arbitration signal to go inactive.

When the current master is ready to relinquish control of the bus, the current master begins arbitration by driving the arbitration line active a second time. In response to the commencement of arbitration, each interface 300 of a device requiring the bus applies an arbitration signal on a byte enable line representing the block of the device in step 1003. A block is a group of devices having the same priority for use of the bus. There may be as many blocks on a bus as there byte enable lines. For example, there are four byte enable lines in the preferred embodiment and there are four blocks or levels of priority.

Each interface 300 reads all of the arbitration signals in step 1004. In step 1005, interface 300 determines if the block of the device is the highest priority block arbitrating. If the device does not belong to the highest priority block, the interface releases the byte enable lines controlled by the device in step 1009 and process 900 ends for interface 300. If the device belongs to the block having the highest priority, interface 300 then applies an arbitration signal to the byte enable line representing the priority of the device within the block in step 1006. In step 1007, interface 300 reads all of the arbitration signals from the byte enable lines and determines if interface 300 is the next master. If interface 300 is the next master, interface 300 indicates that it is the next master in step 1008 and process 1000 ends. If interface 300 is not the next master, process 1000 ends. The above described arbitration process minimizes the number of lines needed for arbitration. This is done by using the byte enable lines twice to complete block arbitration and then arbitration in the block. This prevents the need for an arbitration line for each device connected to a bus.

Figure 11:
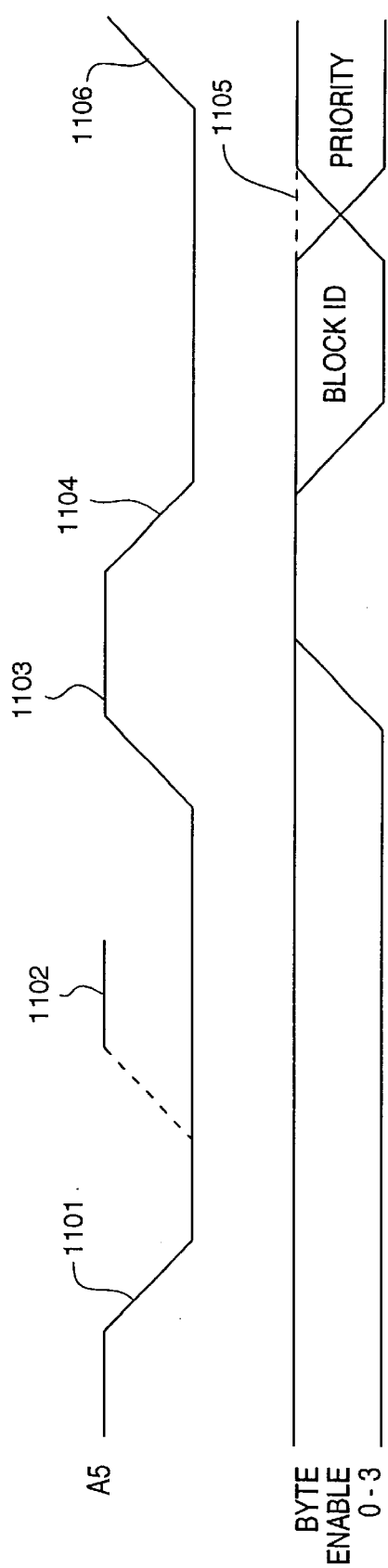
FIG. 11 is a time diagram of an arbitration process performed over a communications bus.

A Time Diagram of Signals over an Communications Bus during Arbitration—FIG. 11

An arbitration timing diagram is provided to demonstrate the signaling between interfaces 300 over an communications bus during an arbitration for control of the bus. Arbitration begins at time 1101 with an interface requiring the communication bus applying an arbitration signal to the arbitration line of the communication bus. At time 1102, the current master takes control of the arbitration line in the preferred embodiment. The arbitration request is then acknowledged by the current master by driving the arbitration signal inactive at time 1103. Interfaces 300 also latch internal requests for arbitration at time 1103. Arbitration begins at time 1104 with the current bus master driving the arbitration line active a second time. Each interface 300 that wants control of the bus applies a signal to the byte enable line that represents the block of the interface 300.

Each interface 300 then determines if it is in the block that has the highest priority of the blocks containing an arbitration signal. The block with the highest priority can be determined using any algorithm that fairly distributes the assignment of the highest priority block The interfaces 300 in devices in lower priority blocks release all arbitration signals. The interface 300 in devices of the highest priority block, then apply an arbitration signal to the byte enable line representing the priority of the device in the block at time 1105. This may be determined by any algorithm that fairly distributes the outcome of arbitration. Arbitration ends at time 1106 with the next bus master being latched and the arbitration signals being released.

Handling of Interrupt Conditions in Device—FIG. 13.

Since each bus in the expandable bus system is passive, there may be no central processing unit to handle interrupts in the devices. FIG. 13 describes a process for handling interrupts in devices connected to the system. FIG. 13 illustrates the process completed by an interrupt controller to handle an interrupt in a device. Interrupts are handled by a device that performs the function of an interrupt controller. In the expandable bus system, there may be one device connected to all m busses such as device 110 that acts as the interrupt controller for all m busses or there may be a separate interrupt controllers connected to each bus, such as devices 113 and 117, that act as the interrupt controller for that particular bus.

FIG. 13 illustrates process 1300 executed by an interrupt controller to handle interrupts over a bus. When a device requires an interrupt, the device applies an interrupt request to an interrupt request line. Only unmasked devices can request an interrupt as described below. In step 1301, the interrupt controller receives the interrupt request. The interrupt controller then enters arbitration to gain control of the bus in step 1302. When the interrupt controller gains control of the bus, the interrupt determines which devices require an interrupt in step 1303.

The determination of devices requiring an interrupt is completed by the interrupt controller performing an interrupt read. An interrupt read is performed in the following manner. First, the interrupt controller applies an interrupt address to the bus. The interrupt address is an address that indicates that an interrupt read cycle is occurring. The interrupt controller then applies an initiator signal to the bus to start the process. All devices needing an interrupt then apply a signal to a data line indicating the level of the interrupt for the device.

After all of the signal from devices have been read, the interrupt controller decides which interrupts to service in step 1304. In step 1305, the interrupt control for the bus masks interrupts of a lower priority than the interrupt being service by performing an interrupt write. An interrupt write is performed in the following manner. First the interrupt controller applies an interrupt address to the bus. The interrupt controller then applies an initiation signal to the bus. Signals are then applied to the data lines indicating the level of interrupts that are masked. Devices that have a masked interrupt cannot signal for an interrupt. The interrupts of unmasked devices are serviced in step 1306. A second interrupt write is then performed in 1307 to unmask the appropriate interrupt levels.

The above description is one possible embodiment of an expandable communications bus system having multiple communication busses. It is expected that those skilled in the art can and will design alternative expandable communications Bus Systems that can and will infringe on the present invention as set forth below in the claims either literally or through the Doctrine of Equivalents.

What is claimed is:

1. A bus system in a computer system for providing variable datawidth data transfers and concurrent data transfers between a plurality of devices in said computer system comprising:

a plurality of busses with each bus being capable of transferring n bits of data;

means in each of said plurality of devices for connecting said each of said plurality of devices to at least one of said plurality of busses; and means in a first device of said plurality of devices for detecting a set of x busses from said at least one of said plurality of busses connected to said first device that are also connected to a second device of said plurality of devices responsive to said first device requiring a data transfer of m bits of data with said second device wherein x is equal to or greater than one and m is a multiple of n;

means responsive to a detection of said set of x busses for determining a set of y busses from said set of x busses that are available to transfer data between said first and second device wherein y is less than or equal to x; and means responsive to a determination of said set of y busses that are available to transfer data for transferring data over said set of y busses between said first device and said second device to complete said transfer.

2. The system of claim 1 wherein y is equal to or greater than m divided by n and said means for transferring transfers data over said set of y busses in one data cycle.

3. The system of claim 1 wherein y is less than m divided by n and said means for transferring comprises:

means for transferring n bits of data over said each bus in said y set of busses;

means for arbitrating for control of busses in said set of x busses not included in said set of y busses; and means for subsequently transferring remaining data over said set of y busses and each of said busses in set of x busses that said first device gains through arbitration.

4. The system of claim 1 wherein said plurality of busses contains a set of z busses that are available to transmit data between devices other than said first and second devices wherein z is equal to or greater than one and said set of z busses do not include busses in said set of y busses.

5. The system of claim 1 wherein each said means for connecting comprises:

an interface means for each bus of said plurality of busses connected to said device.

6. The system of claim 5 wherein each interface means comprises:

means for arbitrating with interface means in other devices connected to a bus to determine which device is the master of said bus.

7. The system of claim 6 wherein said interface means in said first device further comprises:

means for transmitting an address of said second device from said first device over a corresponding one of said busses responsive to said first device being the master of said corresponding bus; and means for transmitting an initiator signal over said corresponding one of said plurality of busses responsive to said address being transmitted to indicate said address is valid.

8. The system of claim 7 wherein each interface means in said second device comprises:

means for determining whether said address is equal to said address of said second device responsive to said interface means in said first device transmitting said initiator signal; and means responsive to a determination that said transmitted address equals said address of said second device for transmitting a target signal to said first device to acknowledge said second device is ready to complete said data transfer.

9. The system of claim 6 wherein said means for arbitrating comprises:

means for transmitting an arbitration request signal over said bus;

means for receiving an arbitration acknowledgment signal over said bus responsive to a transmission of said arbitration request signal;

means responsive to a reception of said arbitration acknowledgment signal for transmitting an arbitration priority signal;

means for receiving arbitration priority signals from other devices;

means responsive to a reception of said arbitration priority signals from other devices for determining a next bus master.

10. The system of claim 6 wherein said means for arbitrating comprises:

means for transmitting an arbitration request signal over said bus;

means for receiving an arbitration acknowledgment signal over said bus transmitted from a current master of said bus responsive to the reception of said arbitration request signal;

means responsive to a reception of said arbitration acknowledgment signal for transmitting an arbitration block priority signal;

means for receiving arbitration block priority signals from other devices;

means responsive to the reception of said arbitration block priority signals from said other devices for determining whether a block containing said device has the highest priority for use of said bus;

means responsive to a determination that said block containing said device has a highest priority for control of said bus for transmitting an arbitration signal;

means for receiving arbitrations signals from other devices in said block containing said device; and means responsive to the reception of said arbitration signals for determining said device has control of said bus.

11. The system of claim 5 wherein each said interface means in said first device further comprises:

means for determining whether said first device is a master of a bus; and means responsive to a determination that said first device is said master of said bus for performing a cycle of said data transfer.

12. The system of claim 11 wherein each said interface means in said first device further comprises:

means responsive to a determination that said first device is said master of said bus for determining said set of x busses that connect said first device to said second device; and said means for performing said cycle being responsive to a determination that no other of said plurality of busses are connected to said second device.

13. The system of claim 12 wherein each said interface means in said first device further comprises:

means responsive to a determination said set of x busses for determining whether said first device is a current master of at least one of said other busses; and said means for performing said cycle being responsive to a determination that said first device is not said current master of said at least n on of said set of x busses.

14. The system of claim 13 wherein each said interface means in said first device further comprises:

means responsive to a determination that said first device is a current master of said at least one of said other busses for determining if said bus is a preferred path for said data transfer; and said means for performing said cycle being responsive to a determination that said bus is said preferred path.

15. The system of claim 11 wherein each said interface means of said first device further comprises:

means responsive to performance of said cycle for determining whether there are data cycles pending; and means for relinquishing control said one bus responsive to a determination that no data cycles are pending.

16. The system of claim 11 wherein each said interface means said first device further comprises:

means responsive to a determination that said first device is not said master of said bus for determining whether said second device is connected to other busses connected to said first device; and means responsive to a determination that said second device is not connected to another bus for transmitting an arbitration signal requesting control of said bus.

17. The system of claim 16 wherein each said interface means in said first device further comprises:

means responsive to a determination that said second device is connected to other busses for determining whether said first device is a current master of at least one of said other busses; and said means for transmitting said arbitration signal being responsive to a determination that said first device is not said current master of said at least one of said other busses.

18. The system of claim 16 wherein each said interface means in said first device further comprises:

said means for performing said cycle being responsive to said first device being a master of said at least one of said other busses.

19. The system of claim 18 wherein each said interface means in said first device further comprises:

means for determining whether said data transfer can be completed by said at least one of said other busses having said first device as a master in said one data cycle; and said means for transmitting said arbitration signal being responsive to a determination that said data transfer cannot be completed in said one data cycle.

20. The system of claim 1 further comprising:

means in each of said plurality of devices for transmitting an interrupt request over each of said plurality of busses connected to said plurality of devices; and means connected to each of said plurality of busses for handling said interrupt request.

21. The system of claim 1 wherein said first device provides a clock for said data transfer responsive to said first device transferring data to second device.

22. The system of claim 1 wherein said second device provides a clock for said data transfer responsive to said second device transferring data to said first device.

23. The system of claim 1 further comprising:
means in said first device for signaling said second device that said data transfer is a burst of consecutive data transfers.

24. An expandable communication bus system in a computer system having a plurality of busses for providing variable datawidth data transfers and concurrent data transfers between devices in said computer system, said system comprising:
n data lines for transferring data;
q control lines for transmitting control signals between devices; and
means in each device for transmitting and receiving arbitration signals between a plurality of devices wherein arbitration for said plurality of busses is performed in each device connected to said bus in a two step priority block manner.

25. A method for transferring data between a first device and a second device in a computer system over a plurality of busses comprising the steps of:
detecting a set of x busses from said plurality of busses connected to said first device that are also connected to a second device responsive to said first device requiring a data transfer of m multiplied by n bits of data with said second device wherein x is equal to or greater than one, m is greater than or equal to one and n is a number of bits each of said plurality of busses transmit;
determining a set of y busses from said set of x busses that can be used to transfer data between said first and second device responsive to a detection of said set of x busses wherein y is less than or equal to x; and
transferring data over said set of y busses between said first device and said second device to complete said transfer responsive to a determination of said set of y busses that can be used to transfer data.

26. The method of claim 25 wherein y is greater than m and said step of transferring transfers data in one data cycle.

27. The method of claim 25 wherein y is less than m and said means for transferring comprises:
transferring y multiplied by n bits of data over said set of y busses;
arbitrating for control of remaining busses in said set of x busses that do not belong to said set of y busses; and
subsequently transferring m-y bits of data over said set of y busses and each of said remaining busses that said first device gains through arbitration.

28. The method of claim 25 wherein said plurality of busses contains a set of z busses wherein said set of z busses include busses other than said set of y busses that are available to transmit data between devices other than said first and second devices.

29. The method of claim 25 wherein a device to bus system bridge connects each device to said bus system comprises a bus interface for each of said plurality of busses connected to said device.

30. The method of claim 29 wherein each bus interface performs the step of:
arbitrating with bus interfaces in other devices connected to one of said plurality of busses to determine which device is the master of said one of said plurality of busses.

31. The method of claim 30 wherein each of said bus interfaces in said first device performs the steps of:
transmitting an address of said second device from said first device over a corresponding one of said plurality of busses responsive to said first device being the master of said corresponding one of said plurality of busses; and
transmitting an initiator signal over said corresponding one of said plurality of busses responsive to said address being transmitted to indicate said address is valid.

32. The method of claim 31 wherein each bus interface in said second device performs the steps of:
determining whether said transmitted address is equal to an address of said second device responsive to said first device transmitting said initiator signal; and
transmitting a target signal to said first device to acknowledge said second device is ready to complete said data transfer responsive a determination that said transmitted address is said address of said second device.

33. The method of claim 30 wherein said step of arbitrating comprises the steps of:
transmitting an arbitration request signal over said one of said plurality of busses;
receiving an arbitration acknowledgment signal over said one of said plurality of busses responsive to a transmission of said arbitration request signal;
transmitting an arbitration priority signal responsive to a reception of said arbitration acknowledgment signal;
receiving arbitration priority signals from other devices; and
determining a next bus master responsive to the reception of said arbitration priority signals from other devices.

34. The method of claim 30 wherein said step of arbitrating comprises the steps of:
transmitting an arbitration request signal over said one of said plurality of busses;
receiving an arbitration acknowledgment signal over said one of said plurality of busses transmitted from a current master of said one of said plurality of busses responsive to the reception of said arbitration request signal;
transmitting an arbitration block priority signal responsive to a reception of said arbitration acknowledgment signal;
receiving arbitration block priority signals from other devices;
determining whether a block containing said device has a highest priority for use of said one of said plurality of busses responsive to a reception of said arbitration block priority signals from other devices;
transmitting an arbitration signal responsive to a determination that said block containing said device has said highest priority for use of said one of said plurality of busses;
receiving arbitrations signals from other devices in said block containing said device; and
determining said device has control of said bus responsive to the reception of said arbitration signals.

35. The method of claim 29 wherein each said bus interface in said first device performs the steps of:
determining whether said first device is a master of said one of said plurality of busses; and
performing a cycle of said data transfer responsive to a determination that said first device is said master of said one of said plurality of busses.

36. The method of claim 35 wherein each said bus interface said first device further performs the steps of:

determining which of said set of x busses connected to said first device are also connected to said second device responsive to a determination that said first device is said master of one of said plurality of said busses connected to said bus interface; and said step of performing said cycle is responsive to a determination that no other said busses are connected to said second device.

37. The method of claim 36 wherein each said bus interface in said first device further performs the steps of:

determining whether said first device is a current master of at least one other of said set of x busses responsive to a determination that said second device is connected to other busses; and said step of performing said cycle is responsive to a determination that said first device is not said current master of said at least one other of said set of x busses.

38. The method of claim 37 wherein each said bus interface in said first device further performs the steps of:

determining if said one of said plurality of busses is a preferred path for said data transfer responsive to a determination that said first device is a current master of said at least one other of said set of x busses; and said step of performing said cycle is responsive to a determination that said one of said plurality of busses is said preferred path.

39. The method of claim 35, wherein each said bus interface of said first device further comprises:

determining whether there are data cycles pending responsive to performance of said cycle; and relinquishing control said one of said plurality of busses responsive to a determination that no data cycles are pending.

40. The method of claim 35 wherein each said bus interface of said first device further performs the steps of:

determining whether said second device is connected to other busses connected to said first device responsive to a determination that said first device is not said master of said one of said plurality of busses; and transmitting an arbitration signal requesting control of said one of said plurality of busses responsive to a determination that said second device is not connected to another bus.

41. The method of claim 40 wherein each said bus interface in said first device further performs the steps of:

determining whether said first device is a current master of at least one of said other busses responsive to a determination that said second device is connected to said other busses; and said step of transmitting said arbitration signal is responsive to a determination that said first device is not said current master of said at least one of said other busses.

42. The method of claim 41 wherein each said bus interface in said first device further performs the steps of:

said step of performing said cycle is responsive to said first device being master of said at least one of said other busses.

43. The method of claim 42 wherein each said bus interface in said first device further performs the steps of:

determining whether said data transfer can be completed by said at least one of said other busses having said first device as a master in said one data cycle; and transmitting said arbitration signal responsive to a determination that said data transfer cannot be completed in said one data cycle.

44. The method of claim 25 further comprising the steps of:

transmitting an interrupt request over said plurality of busses when an interrupt is needed;

receiving said interrupt request in an interrupt handler; and handling said interrupt request in said interrupt handler responsive to receiving said interrupt request.

45. The method of claim 25 wherein said first device provides a clock for said data transfer responsive to said first device transferring data to said second device.

46. The method of claim 25 wherein said second device provides a clock for said data transfer responsive to said second device transferring data to said first device.

* * * * *